Nov. 17, 1959   J. W. SMITH ET AL   2,913,651
CONTROL SYSTEM FOR A REVERSIBLE MOTOR
Filed Sept. 27, 1957   3 Sheets-Sheet 1

WITNESSES:
Bernard R. Giguay
Leon J. Jaga

INVENTORS
Joseph W. Smith and
George Samios
BY
Paul E. Friedemann
ATTORNEY

United States Patent Office 2,913,651
Patented Nov. 17, 1959

2,913,651

CONTROL SYSTEM FOR A REVERSIBLE MOTOR

Joseph W. Smith and George Samios, Tonawanda, N.Y., assignors to Westinghouse Electric Corporation, East Pittsburgh, Pa., a corporation of Pennsylvania Application September 27, 1957, Serial No. 686,776

7 Claims. (Cl. 318—282)

This invention relates to control systems for drives using reversible electric motor means, and has as an object to control such systems with static logic decision elements.

Reversible electric motors are used to drive reciprocatory mechanisms such, for example, as the forward and reverse mechanisms of drill presses, planers, etc. This invention uses contactless static logic decision elements and limit switches for controlling the operations of such mechanisms. In one embodiment of this invention, a forward contactless limit switch is operated at or near the end of the forward movement of a reciprocatory mechanism, and a reverse contactless limit switch is operated at or near the end of the reverse movement of the mechanism.

In single cycle operation, a forward push-button is momentarily depressed and starts a motor in the forward direction. The motor continues to operate in the forward direction until stopped by a stop push-button or reversed by a signal from the forward limit switch, following which the motor will run in the reverse direction until stopped by a signal from the reverse limit switch or by the stop push-button. If the motor is stopped by the stop push-button, it can be started again by pushing either the forward or a reverse push-button, the motor then running in the selected direction.

In automatic operation, the motor is not stopped by the limit switches which act to reverse the motor so that the forward and reverse motions continue automatically.

Since the static logic decision elements and limit switches used employ no contacts, they are less likely to fail in service, and require less maintenance than prior controls.

A stated object of this invention is to provide a single magnetic amplifier for energizing inductive loads such as the forward and reverse field windings of electric motors.

Other objects and advantages will become more apparent from a study of the folowing specification and the accompanying drawings.

This invention will now be described with reference to the annexed drawings, of which:

Figure 1:
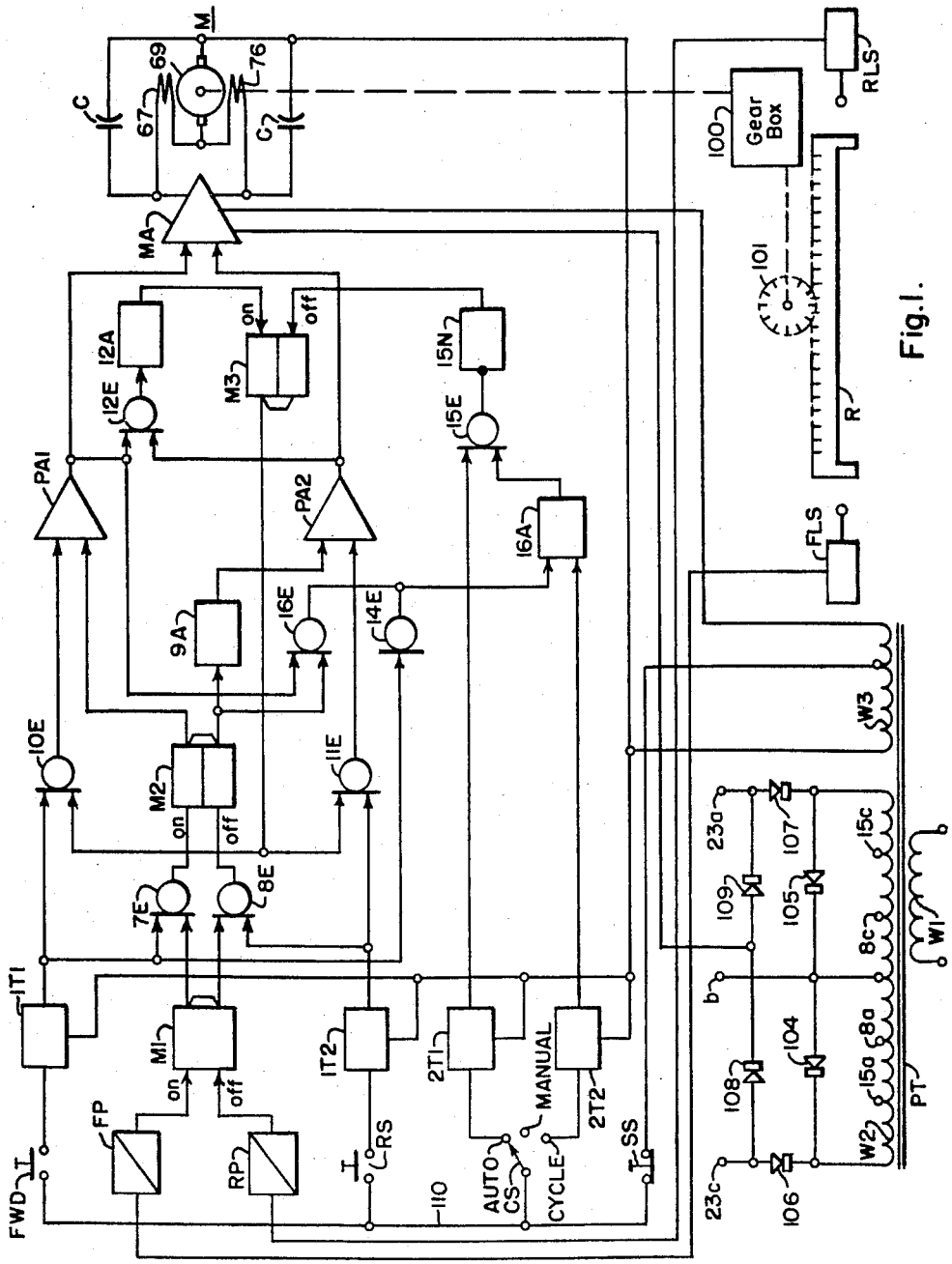
Figure 1 is a diagram, with many parts shown merely in block form, of an electric control system embodying this invention.

The And, Or, Not and Memory circuits for use in the practice of this invention are similar to those described in the July 1956 edition of Westinghouse Engineer, volume 16, No. 4, published by Westinghouse Electric Corporation, Pittsburgh, Pa., but since the And, Not and Memory circuits must have their A.C. and D.C. supply terminals connected to corresponding terminals of their power supply having the proper phases and polarities, these units are shown in Figs. 2–5 of the drawings for the purpose of explaining how their connections to the A.C. and D.C. power supply terminals of Fig. 1 should be made. It is believed to be proper at this time to describe these logic circuits generally as follows:

An And circuit is a circuit that responds to one or more signals having the same phase, and has an output signal only when all of its input signals are present. The phase of the output signal of an And unit is opposite to that of its input signals. A one-input And unit can be used for phase reversal of a signal.

Figure 2:
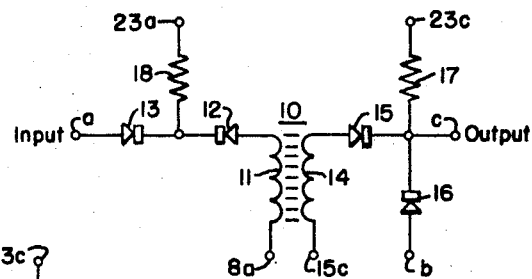
Fig. 2 shows a circuit of a one-input And unit used in the system of Fig. 1.

Fig. 2 shows a one-input And circuit indicated to be phased to receive an $a$ input signal. It has a terminal legended Output which is indicated to produce a $c$ output signal. The $a$ and $c$ signals have the same polarity but have opposite phase in that they are displaced 180° on a time basis. The circuit of Fig. 2 has a transformer 10 with a core having a rectangular hysteresis loop, the core having a reset winding 11 connected at one end through oppositely poled diodes 12 and 13 to the Input terminal, and connected at its other end to A.C. terminal 8$a$ of Fig. 1. The core has a gate winding 14 connected at one end through diode 15 to the Output terminal. The diode 15 is connected through an oppositely poled diode 16 to $b$ (common) terminal of Fig. 1. The Output terminal is connected through a resistor 17 to D.C. terminal 23$c$ of Fig. 1. The other end of the winding 14 is connected to A.C. terminal 15$c$ of Fig. 1. The junction of the diodes 12 and 13 is connected through a resistor 18 to D.C. terminal 23$a$ of Fig. 1.

If the input signal is to be a $c$ signal instead of an $a$ signal, all power connections of Fig. 2 would be reversed. That is, the 23$c$ and 8$a$ connections of Fig. 2 would be made to the 23$a$ and 8$c$ respectively, terminals of Fig. 1, and the 15$c$ connection of Fig. 2 would be connected to the 15$a$ terminal of Fig. 1.

Control of the input of Fig. 2 is derived from the reset winding 11 magnetizing force which is opposite to that of the gate winding 14. With an input missing, the core is reset, and no output of a specified phase $a$ or $c$ is produced. When a voltage of the proper magnitude and phase is introduced in an input signal, the rectifiers 12 and 13 are blocked when the reset current is zero so that the gate winding circuit causes the core to saturate and to produce a half-wave output.

Figure 3:
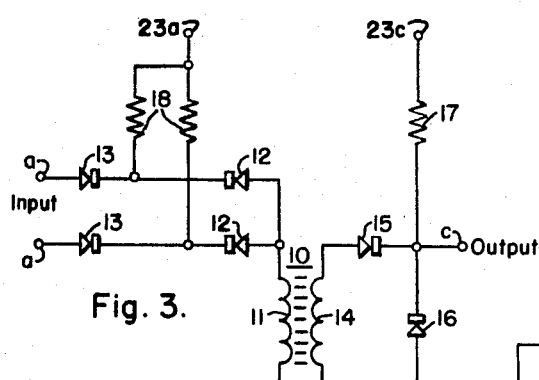
Fig. 3 shows a circuit of a two-input And unit used in the system of Fig. 1.

Fig. 3 is a two-input And circuit, and is similar to Fig. 2 except that another input terminal is provided, and another diode 12, another diode 13, and another bias resistor 18 are provided. It operates in the same way as Fig. 2 except that a signal of the proper phase at both of the two input terminals is required to produce an output signal.

Figure 4:
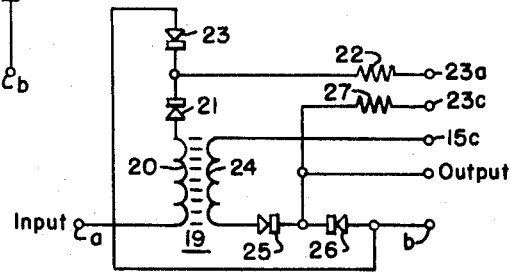
Fig. 4 shows a circuit of a Not unit used in the system of Fig. 1.

A Not circuit is a circuit which has a substantially zero output when an input signal of the proper phase is applied thereto, and has an output signal when there is no input signal. Fig. 4 shows a circuit, and comprises a transformer 19 having a core with a rectangular hyteresis loop, the core having a reset winding 20 connected at one end to an Input terminal, and at its other end through diode 21 and resistor 22 to supply terminals 23$a$ of Fig. 1.

The diode 21 is connected through an oppositely poled diode 23 to the *b* terminal of Fig. 1. The core of the transformer 19 has a gate winding 24 connected at one end to the 15c terminal of Fig. 1, and connected at its other end through oppositely poled diodes 25 and 26 to the *b* terminal of Fig. 1. The junction of the diodes 25 and 26 is connected to the Output terminal of Fig. 4, and through a resistor 27 to the 23c terminal of Fig. 1. No A.C. resetting voltage is used in this circuit as in the case of Figs. 2 and 3. Exciting current in the gate winding 24 causes the core to saturate when no input signal is present, and to produce an output signal. When an input signal of the proper phase and magnitude is present, reset current flows through the reset winding 20 which is 180° out-of-phase with the gating voltage so that there is no output. The Not circuit shown is for receiving an *a* input signal. If a *c* signal is to be received, the connections to 23*a* and 23*c* would be reversed, and the connections to 15c would be changed to 15*a*.

Figure 5:
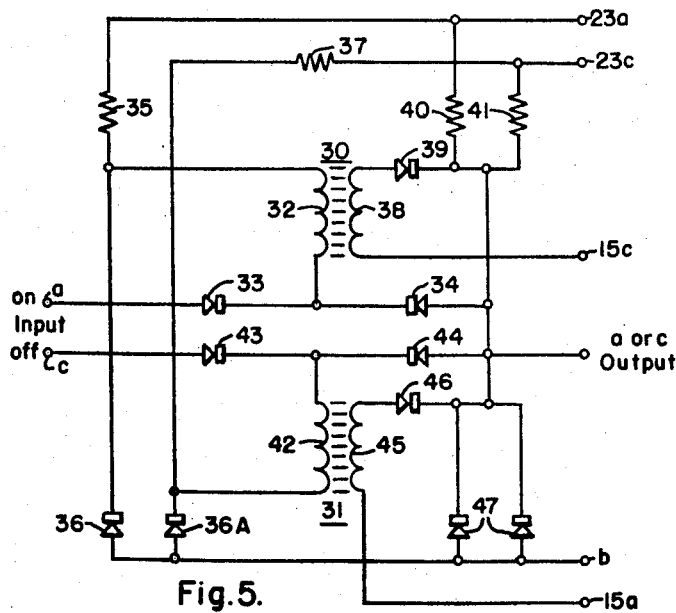
Fig. 5 shows a circuit of a Memory unit used in the system of Fig. 1.

A Memory circuit is a bistable circuit that, in response to a first or "on" input signal, produces an output signal that is maintained even though the first signal has ended. The Memory circuit is reset and the first output signal is terminated in response to a second input or "off" signal having the opposite phase to the first signal. Fig. 5 shows a Memory circuit having transformers 30 and 31 with cores having rectangular hysteresis loops. The transformer 30 has a reset winding 32 connected at one end through diode 34 to the Output terminal. The winding 32 is connected at its other end through resistor 35 to the 23*a* terminal of Fig. 1, and connected through diode 36 to the *b* terminal of Fig. 1. The gating winding 38 of the transformer 30 is connected through diode 39 and resistor 40 to the 23*a* terminal of Fig. 1, and through resistor 41 to the 23*c* terminal of Fig. 1. The other end of the winding 38 is connected to the 15c terminal of Fig. 1.

The transformer 31 has a reset winding 42 connected through diode 43 to the On Input terminal, and through diode 44 to the Output terminal. The other end of the winding 42 is connected through diode 36A to the *b* terminal of Fig. 1, and through resistor 37 to the 23c terminal of Fig. 1. The transformer 31 has a gating winding 45 connected through diode 46 and parallel connected diodes 47 to the *b* connection of Fig. 1, and to the Output terminal, and connected at its other end to the 15*a* terminal of Fig. 1.

The Memory circuit is seen to consist of two Not circuits which are sensitive to opposite phase input signals. A continuous *c* output is provided when the first input signal *c* occurs, and the *c* output is stopped and an *a* output is provided when the second input signal *a* occurs. The Not circuits are connected in parallel, but the A.C. voltages are connected with the phase relationships shown, so that one of the two cores is gating while the other is resetting. The common output voltage is fed back to the common control circuit so that the output of one Not circuit serves as the input to the other. Once an output has been established, a signal is continuously provided to maintain this output without the necessity of applying an external signal. If the input terminal shown as receiving an *a* input signal is to receive a *c* input signal, and the input terminal shown as receiving a *c* input signal is to receive an *a* input signal, then the power supply connections to the terminals having *a* and *c* suffixes would be reversed.

It is convenient to describe a Memory unit as having been turned on when one input signal has been applied, and as turned off when the other (opposite phase) input signal is applied. When both input terminals are supplied simultaneously with signals to which they are phased, the Memory circuit has no useful output.

On Fig. 1, the input signals to the And, Not, and Memory units are shown as *a* or *c* so that it should be understood how the proper connections to the power supply can be made.

An Or circuit supplies an output signal when any input signal is applied. It requires no A.C. or D.C. connections, and so is not shown. It may have only a single input.

The Preamplifiers of Fig. 1 are similar to the two-input And unit of Fig. 3, and differ therefrom only in that their output windings have larger wire than the output winding of a two-input And unit, so that they can carry larger currents.

Figure 6:
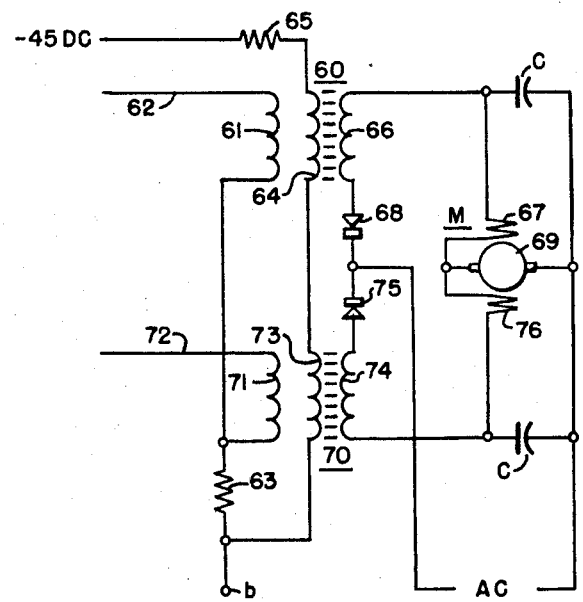
Fig. 6 shows a circuit of the Magnetic Amplifier used in the system of Fig. 1.

The Magnetic Amplifier MA of Fig. 1, the circuit of which is shown by Fig. 6, was designed to supply D.C. to the forward and reverse field windings 67 and 76 of the electric motor M which drives the reciprocatory rack R shown by Fig. 1. The amplifier has a core 60 having an input winding 61 connected at one end to receive a half-wave input signal on conductor 62 from Preamplifier PA1 of Fig. 1, and connected at its other end through resistor 63 to the *b* terminal of Fig. 1. The core 60 has a bias winding 64 connected at one end through resistor 65 to the —45 volt full-wave D.C. terminal of Fig. 1, and connected at its other end through bias winding 73 of core 70 to the *b* terminal of Fig. 1. Output winding 66 of the core 60 is connected at one end to one end of the forward field winding 67 of the motor M, and at its other end through diode 68 to one end of the 137 volt A.C. winding W3 of Fig. 1. The other end of the forward field winding 67 is connected to one brush of armature 69 of the motor M, the other brush of the armature being connected to the other end of the A.C. winding W3 of Fig. 1. The amplifier has a second core 70 with an input winding 71 connected at one end to receive a half-wave input signal on conductor 72 from Preamplifier PA2 of Fig. 1, and connected at its other end to the resistor 63. The core 70 has an output winding 74 connected through diode 75 to oppositely poled diode 68, and connected at its other end through reverse field winding 76 of the motor M to the brush of the armature 69 to which the forward field winding 67 is connected. Capacitors C are filter capacitors.

The amplifier cores are normally biased to cut-off by the —D.C. in their bias windings so that normally there is no useful output. Application of sufficient drive to an input winding produces magnetizing force opposite to that of the bias, driving the associated core to saturation, and providing A.C. in the associated output winding. The A.C. is rectified by the diode 68 or 75 supplying D.C. to the forward field winding 67 or the reverse field winding 76 respectively.

Figure 7:
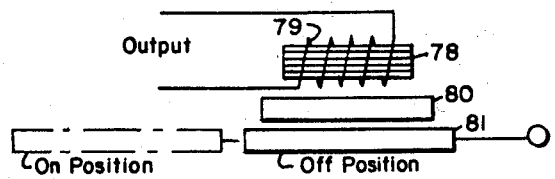
Fig. 7 is a diagrammatic view of one of the contactless Limit Switches used in the system of Fig. 1.

As shown by Fig. 7, a contactless limit switch has a reactor core 78 with a reactor coil 79 thereon. A permanent magnet 80 is alongside the core 78. In "off" position, a steel bar 81 alongside the magnet 80 shunts the flux of the magnet away from the core. The bar 81 is adapted to be moved by the rack R of Fig. 1 to the "on" position shown by the dashed lines of Fig. 7, permitting the magnet 80 to saturate the core 78, the change in the flux providing a voltage across the coil 79 which is supplied as a signal to a Proximity Unit shown in detail by Fig. 8.

Figure 8:
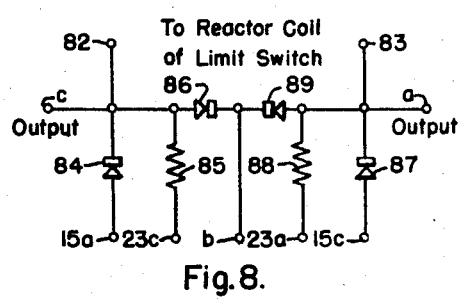
Fig. 8 shows a circuit of one of the Proximity units used in the system of Fig. 1.

The Proximity Unit of Fig. 8 is designed to convert a signal from a limit switch of Fig. 7 to an *a* or a *c* signal of the proper magnitude to operate the static logic unit to which it is connected. The ends of a reactor coil 79 of Fig. 7 are connected to input terminals 82 and 83 of Fig. 8. The terminal 82 is connected to Output terminal *c*, is connected through diode 84 to the 15*a* terminal of Fig. 1, is connected through resistor 85 to the 23c terminal of Fig. 1, and is connected through diode 86 to the *b* terminal of Fig. 1. The terminal 83 is connected to Output terminal *a*, is connected through diode 87 to the 15c terminal of Fig. 1, is connected through resistor 88 to the 23*a* terminal of Fig. 1, and is connected through diode 89 to the common terminal b. The diodes 86 and 89 are oppositely poled.

If the input signal to the following logic unit is to be a c signal, the following logic unit would be connected to the c output terminal of Fig. 8. If the input signal to the following logic unit is to be an a signal, the following unit would be connected to the a output terminal of Fig. 8.

Figure 9:
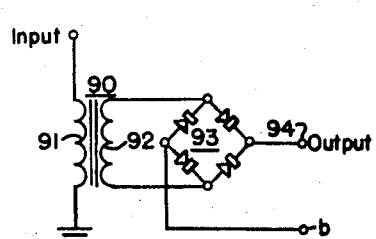
Fig. 9 shows a circuit schematic of one of the Input Transformers used in the system of Fig. 1.

When the Stop, Forward, Reverse, Automatic and Cycle switches of Fig. 1 are closed, they supply A.C. from a 110 volt tap on the 137 volt transformer winding W3 through bus 110 to Input Transformer units 1T1, 1T2, 2T1 and 2T2 respectively. These units change the A.C. to a and c signals of the proper magnitude to operate the following logic units. Fig. 9 shows the details of a typical Input Transformer unit. It consists of a transformer core 90 having a primary winding 91 which is connected by one of the switches to A.C., and has a secondary winding connected through rectifier bridge 93 to output terminal 94 and to common terminal b. Each unit delivers a full-wave D.C. voltage consisting of c pulses alternating with a pulses. The a and c pulses have the same polarity but are displaced by half-wave lengths. A logic unit phase to receive an a signal will not respond to a c signal and vice versa. Thus, all Input Transformer units supply both a and c signals to a following logic unit. The signal used by the latter depends upon how it is phased. The unwanted signal is simply rejected.

Referring now to Fig. 1, the armature 69 of the motor M is mechanically connected through a gear box 100 which drives a pinion gear 101 which is meshed with the teeth of the reciprocatory rack R. The forward limit switch FLS is located to be operated by the rack when the latter reaches its extreme lower position, and the reverse limit switch RLS is located to be operated by the rack when the latter reaches its extreme upper position. FLS is connected through Proximity unit FP to normally supply a c signal to one input of Memory unit M1. RLS is connected through Proximity unit RP to normally supply an a signal to the other input of M1. Since M1 has both input signals, it has no output signal, and cannot have an output signal until one or the other of the two limit switches is operated by the rack R as will be described later.

A power transformer PT has a primary winding W1 connected to a 110 volt A.C. supply source. The transformer PT has a secondary winding W2 having taps connected to the 15a, 8a, 8c and 15c terminals. Oppositely poled diodes 104 and 105 are connected in series across the winding W2. Oppositely poled diodes 106 and 107 are connected in series with one end of the winding W2 and its centertap, and the oppositely poled diodes 108 and 109 are connected in series with the other end of W2 and its centertap. The junction of the diodes 106 and 108 is connected to the 23c terminal, and the junction of the diodes 107 and 109 is connected to the 23a terminal. The centertap of the winding W2 is connected to the b terminal. The transformer PT has another secondary winding W3, the previously mentioned 137 volt winding which is connected to supply A.C. to the amplifier MA. The junction of the diodes 104 and 105 is connected to the amplifier MA to supply the previously mentioned —45 volt bias voltage thereto. A tap on the winding W3 supplies 110 volts through normally closed Stop switch SS and bus 110 to the logic circuits.

A selector switch CS is connected to the bus 110. When CS is set to Auto, it connects Input Transformer 2T1 to the bus 110. When CS is set to Cycle, it connects Input Transformer 2T2 to the bus 110. When CS is set to Manual, it disconnects 2T1 and 2T2 from the bus 110.

Assume that the Selector Switch CS is on Cycle, and connects Input Transformer 2T2 to the supply bus 110. 2T2 supplies an a signal to one input of two-input And unit 16A. Then when the Forward push-button FWD is momentarily pushed in, it connects the Input Transformer unit 1T1 to supply bus 100, 1T1 then supplying a signal to Or unit 10E which supplies a c signal to one input of Preamplifier PA1, and supplies a signal to Or unit 7E which supplies a c signal to turn on Memory unit M2. M2 then supplies the other c signal to turn on Preamplifier 10PA which delivers an output signal through Or unit 12E to one-input And unit 12A which delivers a c signal for turning on Memory unit M3 which then supplies a signal to the Or unit 10E, permitting the push-button FWD to be released while the cycle continues.

The Preamplifier 10PA also supplies a signal through Or unit 16E to the other input of the And unit 16A which then supplies a signal through Or unit 15E to Not unit 15N preventing the latter from delivering an a signal to turn Memory unit M3 off at this time. The Or unit 16E also receives a signal from the off or reverse side of Memory unit M2 which is supplied through And unit 16A to Not unit 15N to keep M3 from being turned off by 15N.

The Preamplifier 10PA also supplies a signal to the Magnetic Amplifier MA causing it to supply current to the forward field winding 67 of the motor M, causing the latter to move the rack R in the forward direction.

When the rack R operates the forward limit switch FLS, the output of the latter is removed so that there is no c signal supplied to the Memory unit M1. The reverse limit switch RLS supplies an a signal through Proximity unit FP to M1 which delivers an a signal through Or unit 8E to turn Memory unit M2 off, removing a c signal from the Preamplifier 10PA, turning it off, and removing the signal supplied through Or unit 12E and And unit which turned Memory unit M3 on. M3 delivers a c signal to the Or unit 11E. The latter delivers an a signal to one input of Preamplifier 11PA which receives another signal through Or unit 9A from the off or reverse side of Memory unit M2. 11PA is turned on and supplies a signal to the Magnetic Amplifier causing the latter to energize the reverse field winding 76 of the motor M. The rack R then reverses its direction and moves towards the reverse limit switch RLS. When the latter is operated by the rack, its output is removed and there is no a signal to the Memory unit M1. The limit switch FLS supplies a c signal through proximity unit FP to turn the Memory unit M1 on. The latter then supplies a c signal through Or unit 7E to turn Memory unit M2 on which then removes the c signal from Or unit 16E. The other signal to 16E was removed by the Preamplifier 10PA being turned off. The And unit 16A cannot now through the Or unit 15E supply a signal to Not unit 5N which is turned off and delivers an a signal to the Memory unit M3 turning it off. The signal from the latter to 11E is cut off, 11PA is turned off, and the signal to the Magnetic Amplifier MA which caused it to energize the reverse field winding is cut off so that the latter is deenergized and the sequence stopped.

It may be necessary to open the Stop switch SS for stopping the motor M, and to return to starting position by closing Reverse push-button RS. When this is done, Input Transformer 1T2 is connected to the bus 110, and supplies a signal through Or unit 8E to turn the Memory unit M2 off, the latter then deliverying an a signal to one-input And unit 9A which delivers a c signal to the Preamplifier 11PA. 1T2 also supplies a signal to Or unit 11E which supplies the other c signal to 11PA causing the latter to supply a signal through Or unit 12E to turn Memory unit M3 on, and to supply a signal to the Magnetic Amplifier MA to cause it to energize the reverse field winding of the motor M, this energization stopping as described in the foregoing when the reverse limit switch RLS is operated.

When the Selector Switch CS is on Auto, the Input Transformer 2T1 is connected to the bus 110, and supplies a signal through the Or unit 15E to the Not unit 15N, keeping Memory unit M3 turned on while the Stop switch is closed so that the forward and reverse cycles are continuously repeated. When the reverse limit switch RLS is operated, it, instead of turning off the Memory unit M3 as it does during Cycle operation, energizes Preamplifier 10PA as described in the foregoing, to cause the Magnetic Amplifier MA to energize the forward field winding of the motor M, one signal to 10PA being supplied from the Memory unit M2, and the other signal being supplied through the Or unit 10E from the Memory unit M3. M3 is turned on by the operation of the forward limit switch FWD as described in the foregoing in connection with Cycle operation.

What we claim is:

1. A control system for reversible motor means driving a reciprocatory mechanism, said motor means having forward and reverse windings, comprising a first limit switch operated by said mechanism when it has reached a forward position, a second limit switch operated by said mechanism when it has reached a reverse position, means including amplifier means connected to said windings and including a Memory unit connected to said amplifier means for energizing said windings, said Memory unit when on causing said amplifier means to energize one of said windings, and when off causing said amplifier means to energize the other of said windings, means including one of said switches for supplying a signal to turn said Memory unit on, and means including the other of said switches for supplying a signal to turn said Memory unit off.

2. A control system for reversible motor means driving a reciprocatory mechanism, said motor means having forward and reverse windings, comprising a first limit switch operated by said mechanism when it has reached a forward position, a second limit switch operated by said mechanism when it has reached a reverse position, amplifier means connected to said field windings, a first Memory unit, first and second two-input Or units, a pair of operator operated switches, one connected to one input of one of said Or units, and the other connected to one input of the other of said Or units, signal supply means connected to said switches, means including means using output signals from said Or units to turn said Memory unit on, means supplying an output signal from said Memory unit to the other inputs of said Or units, a second Memory unit, means including means using a signal from said second Memory unit when on and a signal from one of said Or units to cause said amplifier means to energize one of said windings, means including means using a signal from said second Memory unit when off and a signal from the other of said Or units to cause said amplifier means to energize the other of said windings, means including means for supplying a signal from one of said limit switches for turning said second Memory unit on, and means including means for supplying a signal from the other of said limit switches for turning said second Memory unit off.

3. A control system for reversible motor means driving a reciprocatory mechanism, said motor means having forward and reverse windings, comprising a first limit switch operated by said mechanism when it has reached a forward position, a second limit switch operated by said mechanism when it has reached a reverse position, amplifier means connected to said field windings, a first Memory unit, first and second two-input Or units, a pair of operator operated switches, one connected to one input of one of said Or units, and the other connected to one input of the other of said Or units, signal supply means connected to said switches, a first two-input Preamplifier having one input connected to the output of one of said Or units, a second two-input Preamplifier having one input connected to the output of the other of said Or units, means connecting the outputs of said Preamplifiers to said amplifier means, means supplying output signals from said Preamplifiers for turning said Memory unit on, means supplying an output signal from said Memory unit to the other inputs of said Or units, a second Memory unit, means supplying a signal from said second Memory unit when on to the other input of one of said Preamplifiers to turn said one Preamplifier on, means using a signal from said second Memory unit when off to the other input of the other of said Preamplifiers to turn said other Preamplifier on, means using a signal from one of said limit switches to turn said second Memory unit on, and means using a signal from the other of said limit switches to turn said second Memory unit off, one of said Preamplifiers when on causing said amplifier means to energize one of said windings, and the other of said Preamplifiers when on causing said amplifier means to energize the other of said windings.

4. A control system for reversible motor means driving a reciprocatory mechanism, said motor means having forward and reverse windings, comprising a first limit switch operated by said mechanism when it has reached a forward position, a second limit switch operated by said mechanism when it has reached a reverse position, amplifier means connected to said windings, a first Memory unit, first and second two-input Or units, a forward operator operated switch connected to one input of said first Or unit, a reverse operator operated switch connected to one input of said second Or unit, signal supply means connected to said switches, means including means using signals from said Or units for turning said Memory unit on, means supplying an output signal from said Memory unit to the other inputs of said Or units, a second Memory unit, means including means using a signal from said second Memory unit when on and a signal from said first Or unit to cause said amplifier means to energize said forward winding, means including means using a signal from said second Memory unit when off and a signal from said second Or unit to cause said amplifier means to energize said reverse winding, means using a signal supplied by said first limit switch to turn said second Memory unit on, means using a signal supplied by said second limit switch for turning said second Memory unit off, a Not unit connected to the off input terminal of said first Memory unit, and means including means supplying an on output signal from said second Memory unit for turning said Not unit on, said second Memory unit when off turning said Not unit off which then turns said first Memory unit off.

5. A control system for reversible motor means driving a reciprocatory mechanism, said motor means having forward and reverse windings, comprising a forward limit switch operated by said mechanism when it reaches a forward position, a reverse limit switch operated by said mechanism when it reaches a reverse position, amplifier means connected to said windings, a first Memory unit, first and second two-input Or units, a forward operator operated switch connected to one input of said first Or unit, a reverse operator operated switch connected to one input of said second Or unit, signal supply means connected to said switches, a first two-input Preamplifier having one input connected to the output of said first Or unit, a second two-input Preamplifier having one input connected to the output of said second Or unit, means connecting the outputs of said Preamplifiers to said amplifier means, said first Preamplifier when on causing said amplifier means to energize said reverse winding, said second Preamplifier when on causing said amplifier means to energize said forward winding, means using output signals from said Preamplifiers to turn said Memory unit on, means supplying an output signal from said Memory unit to the other inputs of said Or units, a second Memory unit, means supplying a signal from said second Memory unit when on to the other input of said first Preamplifier to turn said first Preamplifier on, means supplying a signal from said second Memory unit when off to the other input of said second Preamplifier for turning said second Preamplifier on, means using a signal supplied by said forward limit switch for turning said second Memory unit on, means using a signal from said reverse limit switch for turning said second Memory unit off, a Not unit connected to the off input terminal of said first Memory unit, and means including means supplying an on output signal from said second Memory unit for turning said Not unit on, said second Memory unit when off turning said Not unit off which then turns said first Memory unit off.

6. A control system for reversible motor means driving a reciprocatory mechanism, said motor means having forward and reverse windings, comprising a first limit switch operated by said mechanism when it has reached a forward position, a second limit switch operated by said mechanism when it has reached a reverse position, amplifier means connected to said windings, a first Memory unit, a two-input Or unit, an operator operated switch connected to one input of said Or unit, signal supply means connected to said switches, means including means using an output signal from said Or unit to turn said Memory unit on, means supplying an output signal from said Memory unit to the other input of said Or unit, a second Memory unit, means using a signal from said second Memory unit when on and a signal from said Or unit to cause said amplifier means to energize one of said windings, means including means using a signal from said second Memory unit when off to cause said amplifier means to energize the other of said windings, means including means supplying a signal from one of said limit switches for turning said second Memory unit on, and means including means supplying a signal from the other of said limit switches for turning said second Memory unit off.

7. A control system as claimed in claim 6 in which a Not unit is provided with its output connected to the off input terminal of said first Memory unit, and has its input connected to receive an on output signal from said second Memory unit, said second Memory unit when off turning said Not unit off which then supplies a signal to turn said first Memory unit off.

References Cited in the file of this patent

UNITED STATES PATENTS

| | | |
|---|---|---|
| 2,422,958 | Embry | June 24, 1947 |
| 2,486,151 | Gross et al. | Oct. 25, 1949 |
| 2,502,975 | McFarlane | Apr. 4, 1950 |
| 2,767,371 | Beaubien | Oct. 16, 1956 |